United States Patent
Lee et al.

(10) Patent No.: US 11,610,314 B2
(45) Date of Patent: Mar. 21, 2023

(54) PANOPTIC GENERATIVE ADVERSARIAL NETWORK WITH EXPLICIT MODELING OF CATEGORY AND INSTANCE INFORMATION

(71) Applicant: TOYOTA RESEARCH INSTITUTE, INC., Los Altos, CA (US)

(72) Inventors: Kuan-Hui Lee, San Jose, CA (US); Jie Li, Los Altos, CA (US); Adrien David Gaidon, Mountain View, CA (US)

(73) Assignee: TOYOTA RESEARCH INSTITUTE, INC, Los Altos, CA (US)

( * ) Notice: Subject to any disclaimer, the term of this patent is extended or adjusted under 35 U.S.C. 154(b) by 48 days.

(21) Appl. No.: 16/858,373

(22) Filed: Apr. 24, 2020

(65) Prior Publication Data

US 2021/0334976 A1 Oct. 28, 2021

(51) Int. Cl.
*G06T 7/00* (2017.01)
*G06T 7/11* (2017.01)
(Continued)

(52) U.S. Cl.
CPC .............. *G06T 7/11* (2017.01); *G06N 3/0454* (2013.01); *G06T 5/50* (2013.01);
(Continued)

(58) Field of Classification Search
CPC ... G06T 7/11; G06T 5/50; G06T 2207/20221; G06T 2207/20084; G06T 2207/20081; G06N 3/0454
See application file for complete search history.

(56) References Cited

U.S. PATENT DOCUMENTS

| 10,984,286 B2 * | 4/2021 | Dundar | G06T 15/00 |
| 2019/0096125 A1 * | 3/2019 | Schulter | G05D 1/0088 |
| 2020/0320351 A1 * | 10/2020 | Nikolenko | G06K 9/6256 |

FOREIGN PATENT DOCUMENTS

| WO | 2019066794 | 4/2019 | |
| WO | WO-2020239241 A1 * | 12/2020 | |
| WO | WO-2021068182 A1 * | 4/2021 | G06N 3/04 |

OTHER PUBLICATIONS

Zhang et al, Adversarial Complementary Learning for Weakly Supervised Object Localization, 2018 IEEE/CVF conference on computer vision and pattern recognition, pp. 1325-1334 (Year: 2018).*

(Continued)

*Primary Examiner* — Nancy Bitar
*Assistant Examiner* — Xiao Liu
(74) *Attorney, Agent, or Firm* — Sheppard, Mullin, Richter & Hampton LLP; Hector A. Agdeppa; Daniel N. Yannuzzi

(57) ABSTRACT

Systems and methods for panoptic segmentation of an image of a scene, comprising: receiving a synthetic data set as simulation data set in a simulation domain, the simulation data set comprising a plurality of synthetic data objects; disentangling the synthetic data objects by class for a plurality of object classes; training each class of the plurality of classes separately by applying a Generative Adversarial Network (GAN) to each class from the data set in the simulation domain to create a generated instance for each class; combining the generated instances for each class with labels for the objects in each class to obtain a fake instance of an object; fusing the fake instances to create a fused image; and applying a GAN to the fused image and a corresponding real data set in a real-world domain to obtain an updated data set. The process can be repeated across multiple iterations.

16 Claims, 5 Drawing Sheets

(51) Int. Cl.
　　　*G06N 3/04*　　　　(2023.01)
　　　*G06T 5/50*　　　　(2006.01)
(52) U.S. Cl.
　　　CPC .............. *G06T 2207/20081* (2013.01); *G06T 2207/20084* (2013.01); *G06T 2207/20221* (2013.01)

(56) References Cited

OTHER PUBLICATIONS

Liu et al, PanDA: Panoptic Data Augmentation, arXiv:1911.12317v2, Apr. 4, 2020.*
Synthetic data, Wikipedia (Year: 2021).*
Kirillov et al., Panoptic segmentation, CVPR, pp. 9404-9413 (Year: 2019).*
Wikipedia, Image segmentation (Year: 2022).*
Lin et al, Microsoft COCO: Common Objects in Context, Computer Vision—ECCV 2014, pp. 740-755 (Year: 2014).*
Yang, J. et al., LR-GAN: Layered Recursive Generative Adversarial Networks for Image Generation, ICLR, Aug. 2, 2017, pp. 1-21.
Jin, B. et al., Webly Supervised Semantic Segmentation, The IEEE Conference on Computer Vision and Pattern Recognition (CVPR), 2017, pp. 3626-3635.
Vezhnevets, A. et al., Weakly Supervised Semantic Segmentation with a Multi-Image Model, 2011 IEEE International Conference Computer Vision (ICCV), 2011, 9 pgs.

* cited by examiner

PANOPTIC GENERATIVE ADVERSARIAL NETWORK WITH EXPLICIT MODELING OF CATEGORY AND INSTANCE INFORMATION

TECHNICAL FIELD

The present disclosure relates generally to Deep Learning (DL) models for perception, and in particular, some implementations may relate to panoptic segmentation.

DESCRIPTION OF RELATED ART

Recent advances in Deep Learning (DL) are advancing autonomous driving technology greatly. However, deploying deep learning algorithms into real-world autonomous driving applications is not a trivial undertaking. A safe and practical deep learning module for autonomous vehicles and other applications requires extremely high levels of robustness as the real-world presents an extremely diverse data set for which training can be very difficult. Dramatic performance issues can arise if an algorithm is insufficiently prototyped and developed in a small data domain.

Panoptic segmentation for recognition involves both semantic segmentation (assigning each pixel a class label (e.g. for stuff classes)), and instance segmentation (detecting and segmenting each object instance (e.g. for thing classes)). A bottleneck to building useful Deep Learning (DL) models for perception is the amount of manual labeling required for each new task, concept, domain, etc. Conventional solutions have used generative models for improving the task performance by leveraging privileged information. However, due to huge domain gaps between domains, the task performance is still much worse than the supervised learning performance. Current generative models provide somewhat realistic images, yet the generated images still include visible artifacts that affect the task performance during domain transfer.

Large domain gaps between synthetic and real domains are often addressed by manually labeling some amount of real-world target data to train the model on mixed synthetic and real-world labeled data (supervised domain adaptation). In contrast, unsupervised domain adaptation algorithms have leveraged the potential of Generative Adversarial Networks (GANs) for pixel-level adaptation in this context. These methods often use simulators as black-box generators of (x;y) input/output training samples for the desired task.

BRIEF SUMMARY OF THE DISCLOSURE

Embodiments may be implemented to train DL models using a combination of labeled data together with unlabeled data—i.e., a domain adaptation between two different domains. Embodiments may apply the concept of leveraging style-transferring techniques to the domain adaptation problem. As instances (things) behave differently from background (stuff) in terms of performance on semantic segmentation, embodiments may be implemented to deal with things and stuffs separately. Particularly, in some embodiments a learning framework for domain adaptation, facilitated by GANs, is used to improve performance on panoptic (semantic+instance) segmentation. A Panoptic GAN algorithm may be used to train multiple GANs for things and stuff separately, and eventually fuses them together to create a whole scene image. With iterative training steps, the algorithm can incrementally leverage more and more unseen data to improve the segmentation performance.

Although many Unsupervised Domain Adaptation (UDA) methods for semantic segmentation have been well developed, their performance is still not compatible with supervised learning methods. However, due to limitations of manual labeling, full self-supervision is not practical when the unseen data grows exponentially. In order to leverage exponentially growing data while achieving compatible results with supervised learning methods, a Semi-supervised Domain Adaptation (SDA) approach may be implemented, bootstrapping from a limited amount of labeled data and incrementally improving performance by involving more data.

The problem of domain adaptation to address the domain shift issue between real world and synthetic representations in panoptic segmentation may be resolved in various embodiments. Embodiments may involve using labeled data in a semi-supervised way, bootstrapping training by using small amount of labeled data to enable leveraging big unlabeled data for performance improvement.

A method for panoptic segmentation of an image of a scene may include: receiving a synthetic data set as simulation data set in a simulation domain, the simulation data set comprising a plurality of synthetic data objects; disentangling the synthetic data objects by class for a plurality of object classes; training each class of the plurality of classes separately by applying a Generative Adversarial Network (GAN) to each class from the data set in the simulation domain to create a generated instance for each class; combining the generated instances for each class with labels for the objects in each class to obtain a fake instance of an object; fusing the fake instances to create a fused image; and applying a GAN to the fused image and a corresponding real data set in a real-world domain to obtain an updated data set.

The method may further include repeating the process as a next iteration using the updated data set as the simulation data set in the next iteration. The method may further include repeating the process as a plurality iterations subsequent to the next iteration, wherein each subsequent iteration uses the updated data set from its immediately preceding iteration as its simulation data set. A quantity of iterations performed may be a quantity sufficient to train all GAN generators for all classes to be trained.

The method may further include applying a GAN to the simulation data set in a simulation domain and a corresponding real data set in a real-world domain to obtain a fake scene. The method may further include fusing the fake instances with the fake scene to create the fused image. The fused image may include a fake scene with fake instances.

Applying a GAN to each class from the data set in the simulation domain may include applying a GAN to a category of instance and region of instance for each class from the data set in the simulation domain.

A system for panoptic segmentation of an image of a scene may include: a non-transitory memory configured to store instructions; at least one processor configured to execute the instructions to perform the operations of: receiving a synthetic data set as simulation data set in a simulation domain, the simulation data set comprising a plurality of synthetic data objects; disentangling the synthetic data objects by class for a plurality of object classes; training each class of the plurality of classes separately by applying a Generative Adversarial Network (GAN) to each class from the data set in the simulation domain to create a generated instance for each class; combining the generated instances for each class with labels for the objects in each class to obtain a fake instance of an object; fusing the fake instances to create a fused image; and applying a GAN to the fused image and a corresponding real data set in a real-world domain to obtain an updated data set.

The operations may further include repeating the process as a next iteration using the updated data set as the simulation data set in the next iteration. The operations may further include repeating the process as a plurality iterations subsequent to the next iteration, wherein each subsequent iteration uses the updated data set from its immediately preceding iteration as its simulation data set. A quantity of iterations performed may be a quantity sufficient to train all GAN generators for all classes to be trained.

The operations may further include applying a GAN to the simulation data set in a simulation domain and a corresponding real data set in a real-world domain to obtain a fake scene. The operations may include fusing the fake instances with the fake scene to create the fused image. The fused image may include a fake scene with fake instances.

Applying a GAN each class from the data set in the simulation domain may include applying a GAN to a category of instance and region of instance for each class from the data set in the simulation domain.

A method for panoptic segmentation of an image of a scene may include: obtaining the image of the scene; segmenting a background and an object of the image separately using a semantic segmentation, wherein the semantic segmentation may include training multiple Generative Adversarial Networks (GANs) separately for the background and the object of the image, wherein the background may be converted into a semantic background of the image, and the object may be converted into a semantic object of the image based on the semantic segmentation technique; and merging the segmented background and the segmented object images into an entire image of the scene.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can provide a learning framework for domain adaptation, facilitated by GANs, to improve performance on panoptic segmentation. Because instances (things) behave differently from background (stuff) in terms of performance on semantic segmentation, embodiments may be implemented to train the model with things and stuff separately. Particularly, in some embodiments a panoptic GAN algorithm may be used to train multiple GANs for things and stuff separately, and eventually fuse the result to create a whole scene image. With iterative training steps, the algorithm can incrementally leverage more and more unseen data, to improve the segmentation performance.

For example, a machine learning system, trained using images a scene encountered by a vehicle, may process images to identify objects (things and stuff) in a real scene. The techniques may include applying a plurality of Generative Adversarial Networks (GANs) to recognize patterns and relationships in the training examples.

Partially labeled synthetic data sets can be used and the objects detangled to sort them by classification. A GAN can be applied to each class of objects individually to generate labels for the objects. Particularly, for each class a GAN can be applied to the category of instance and the region of instance for that class from the data set in the simulation domain to create a generated instance. Another GAN can be applied to the images from simulation domain and the images from real-world domain to obtain a fake scene. The generated instance is combined with labels for the objects in each class (e.g., a label mask) to obtain a fake instance of an object.

The fake instances are fused together along with the fake scene to create a fake scene with fake instances. A GAN is applied to the fused image and the image from real-world domain to obtain an updated data set. This updated data set is used as the new data set in the simulation domain for the next iteration. The process then repeats in multiple iterations.

The systems and methods disclosed herein may be implemented for use in training algorithms for any of a number of different autonomous or semi-autonomous vehicles and vehicle types. For example, the systems and methods disclosed herein may be used with cars, trucks, buses, construction vehicles and other on- and off-road vehicles. These can include vehicles for transportation of people/personnel, materials or other items. In addition, the technology disclosed herein may also extend to other vehicle types as well. An example Autonomous Vehicle (AV) in which embodiments of the disclosed technology may be implemented is illustrated in FIG. 1.

Figure 1:
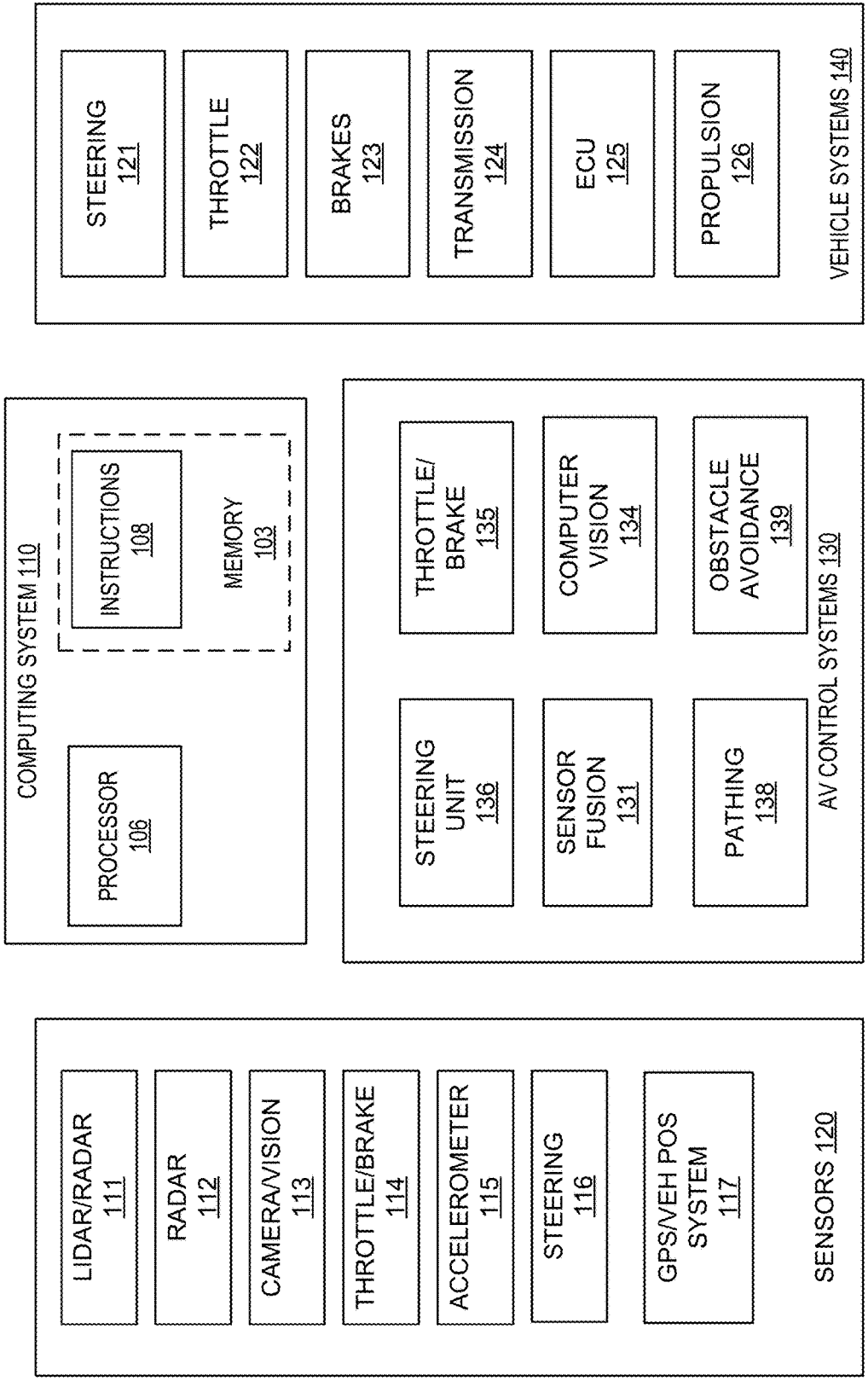
FIG. 1 illustrates an example autonomous or semi-autonomous vehicle with which embodiments of the disclosed technology may be implemented.

FIG. 1 illustrates an example autonomous or semi-autonomous vehicle with which embodiments of the disclosed technology may be implemented. In this example, vehicle 100 includes a computing system 110, sensors 120, AV control systems, 130 and vehicle systems 140. Vehicle 100 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 1 are shown as being partitioned in a particular way, the functions of vehicle 100 can be partitioned in other ways. For example, various vehicle systems and subsystems can be combined in different ways to share functionality.

Sensors 120 may include a plurality of different sensors to gather data regarding vehicle 100, its operator, its operation and its surrounding environment. In this example, sensors 120 include lidar 111, radar 112, or other like the distance measurement sensors, image sensors 113, throttle and brake sensors 114, 3D accelerometers 115, steering sensors 116, and a GPS or other vehicle positioning system 117. One or more of the sensors 120 may gather data and send that data to the vehicle ECU or other processing unit. Sensors 120 (and other vehicle components) may be duplicated for redundancy.

Distance measuring sensors such as lidar 111, radar 112, IR sensors and other like sensors can be used to gather data to measure distances and closing rates to various external objects such as other vehicles, traffic signs, pedestrians, light poles and other objects. Image sensors 113 can include one or more cameras or other image sensors to capture images of the environment around the vehicle as well as internal to the vehicle. Information from image sensors 113 can be used to determine information about the environment surrounding the vehicle 100 including, for example, information regarding other objects surrounding vehicle 100. For example, image sensors 113 may be able to recognize landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 113 can be used in conjunction with other information such as map data or information from positioning system 117 to determine, refined or verify vehicle location.

Throttle and brake sensors 114 can be used to gather data regarding throttle and brake application by a human or autonomous operator. Accelerometers 115 may include a 3D accelerometer to measure roll, pitch and yaw of the vehicle. Accelerometers 115 may include any combination of accelerometers and gyroscopes for the vehicle or any of a number of systems or subsystems within the vehicle to sense position and orientation changes based on inertia.

Steering sensors 116 (e.g., such as a steering angle sensor) can be included to gather data regarding steering input for the vehicle by a human or autonomous operator. A steering sensor may include a position encoder monitor the angle of the steering input in degrees. Analog sensors may collect voltage differences that can be used to determine information about the angle and turn direction, while digital sensors may use an LED or other light source to detect the angle of the steering input. A steering sensor may also provide information on how rapidly the steering wheel is being turned. A steering wheel being turned quickly is generally normal during low-vehicle-speed operation and generally unusual at highway speeds. If the driver is turning the wheel at a fast rate while driving at highway speeds the vehicle computing system may interpret that as an indication that the vehicle is out of control. Steering sensor 116 may also include a steering torque sensor to detect an amount of force the driver is applying to the steering wheel.

Vehicle positioning system 117 (e.g., GPS or other positioning system) can be used to gather position information about a current location of the vehicle as well as other positioning or navigation information.

Although not illustrated, other sensors 120 may be provided as well. Various sensors 120 may be used to provide input to computing system 110 and other systems of vehicle 100 so that the systems have information useful to operate in an autonomous, semi-autonomous or manual mode.

AV control systems 130 may include a plurality of different systems/subsystems to control operation of vehicle 100. In this example, AV control systems 130 include steering unit 136, throttle and brake control unit 135, sensor fusion module 131, computer vision module 134, pathing module 138, and obstacle avoidance module 139. Sensor fusion module 131 can be included to evaluate data from a plurality of sensors, including sensors 120. Sensor fusion module 131 may use computing system 110 or its own computing system to execute algorithms to assess inputs from the various sensors.

Throttle and brake control unit 135 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g, disk, drum, etc.) or engage regenerative braking (e.g., such as in a hybrid or electric vehicle) to slow or stop the vehicle.

Steering unit 136 may include any of a number of different mechanisms to control or alter the heading of the vehicle. For example, steering unit 136 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 136.

Computer vision module 134 may be included to process image data (e.g., image data captured from image sensors 113, or other image data) to evaluate the environment within or surrounding the vehicle. For example, algorithms operating as part of computer vision module 134 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on.

Pathing module 138 may be included to compute a desired path for vehicle 100 based on input from various other sensors and systems. For example, pathing module 138 can use information from positioning system 117, sensor fusion module 131, computer vision module 134, obstacle avoidance module 139 (described below) and other systems to determine a safe path to navigate the vehicle along a segment of a desired route. Pathing module 138 may also be configured to dynamically update the vehicle path as real-time information is received from sensors 120 and other control systems 130.

Obstacle avoidance module 139 can be included to determine control inputs necessary to avoid obstacles detected by sensors 120 or AV control systems 130. Obstacle avoidance module 139 can work in conjunction with pathing module 138 to determine an appropriate path to avoid a detected obstacle.

Vehicle systems 140 may include a plurality of different systems/subsystems to control operation of vehicle 100. In this example, AV control systems 130 include steering system 121, throttle system 122, brakes 123, transmission went 24, electronic control unit (ECU) 125 and propulsion system 126. These vehicle systems 140 may be controlled by AV control systems 130 in autonomous, semi-autonomous or manual mode. For example, in autonomous or semi-autonomous mode, AV control systems 130, alone or in conjunction with other systems, can control vehicle systems 140 to operate the vehicle in a fully or semi-autonomous fashion. This may also include an assist mode in which the vehicle takes over partial control or activates ADAS controls to assist the driver with vehicle operation.

Computing system 110 in the illustrated example includes a processor 106, and memory 103. Some or all of the functions of vehicle 100 may be controlled by computing system 110. Processor 106 can include one or more GPUs, CPUs, microprocessors or any other suitable processing system. Processor 106 may include one or more single core or multicore processors. Processor 106 executes instructions 108 stored in a non-transitory computer readable medium, such as memory 103.

Memory 103 may contain instructions (e.g., program logic) executable by processor 106 to execute various functions of vehicle 100, including those of vehicle systems and subsystems. Memory 103 may contain additional instructions as well, including instructions to transmit data to, receive data from, interact with, and/or control one or more of the sensors 120, AV control systems, 130 and vehicle systems 140. In addition to the instructions, memory 103 may store data and other information used by the vehicle and its systems and subsystems for operation, including operation of vehicle 100 in the autonomous, semi-autonomous or manual modes.

Although one computing system 110 is illustrated in FIG. 1, in various embodiments multiple computing systems 110 can be included. Additionally, one or more systems and subsystems of vehicle 100 can include its own dedicated or shared computing system 110, or a variant thereof. Accordingly, although computing system 110 is illustrated as a discrete computing system, this is for ease of illustration only, and computing system 110 can be distributed among various vehicle systems or components.

Vehicle 100 may also include a wireless communication system (not illustrated) to communicate with other vehicles, infrastructure elements, cloud components and other external entities using any of a number of communication protocols including, for example, V2V, V2I and V2X protocols. Such a wireless communication system may allow vehicle 100 to receive information from other objects including, for example, map data, data regarding infrastructure elements, data regarding operation and intention of surrounding vehicles, and so on. A wireless communication system may also allow vehicle 100 to transmit information to other objects. In some applications, computing functions for various embodiments disclosed herein may be performed entirely on computing system 110, distributed among two or more computing systems 110 of vehicle 100, performed on a cloud-based platform, performed on an edge-based platform, or performed on a combination of the foregoing.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Embodiments for deep learning for image perception utilize synthetic data, such as data generated programmatically. Synthetic data may include computer-generated data created to mimic real data. Embodiments may be implemented to disentangle the components of the data set, and perform multiple iterations.

Figure 2:
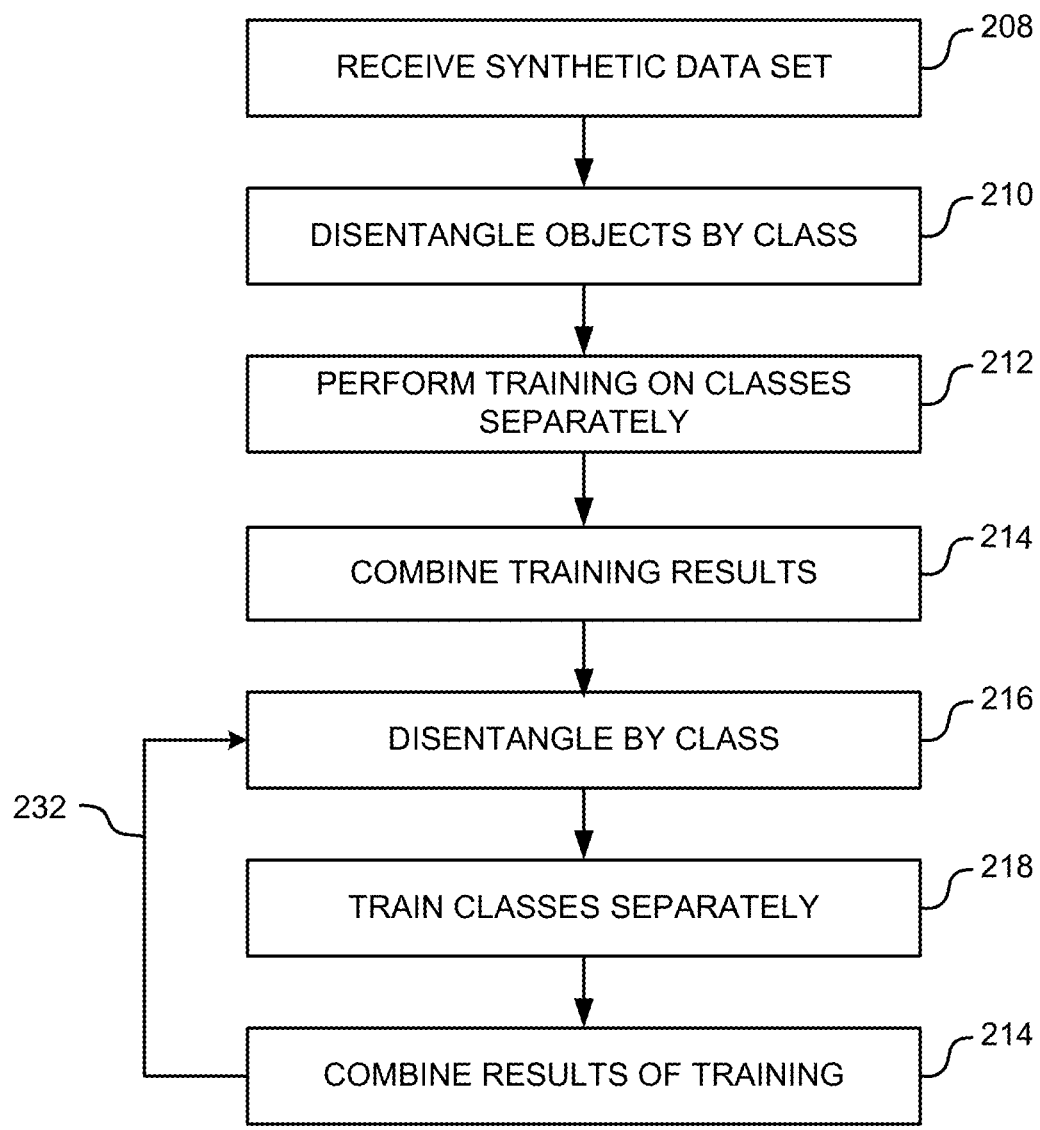
FIG. 2 illustrates an example process for a training framework for unsupervised domain adaptation in accordance with various embodiments.

FIG. 2 illustrates an example process for a training framework for unsupervised domain adaptation in accordance with various embodiments. Referring now to FIG. 2, at operation 208, the system receives a synthetic data set intended to mimic real world data. The synthetic data set may be computer generated or it may be created based on real world data. The synthetic data set is sometimes referred to as simulation data. The synthetic data set may include labeling. In some embodiments, because synthetic data typically costs less than obtaining real world data, a larger amount of labeling can be included with the synthetic data set.

At operation 210 the system disentangles the synthetic data objects by class. Examples of classes can include cars, busses, trucks, pedestrians, buildings, trees, traffic signs, and so on. Classes may also be defined at different levels such as, for example, vehicles instead of cars, busses and trucks. In various embodiments, the disentanglement breaks down, or disentangles, each feature into defined classes. Classes can be broadly or narrowly defined depending on the amount of separation desired for processing. Some embodiments using the disentangled data may rely on a single node to learn a complete feature independent of other nodes.

At operation 212 the system can perform training on the classes separately. This can greatly simplify the training process. In one embodiment, for each class the system applies a GAN to the category of instance and the region of instance for that class from the data set in the simulation domain to create a generated instance.

Another GAN, different from the GANs in the preceding paragraph, can be applied to the images from simulation domain and corresponding images from real-world domain to obtain a fake scene. Embodiments may be implemented such that this GAN generates more realistic data that may be used to attempt to fool another discriminator.

At operation 214, results of the class-by-class training are combined to pull all the classes together. In some embodiments, the results are added into a composite image, similar to alpha blending. The generated instance is combined with labels for the objects in each class (e.g., a label mask) to obtain a fake instance of an object. The fake instances are fused together along with the fake scene to create a fake scene with fake instances. A GAN is applied to the fused image and the image from real-world domain to obtain an updated data set. This updated data set is used as the new data set in the simulation domain for the next iteration. The process then repeats in multiple iterations.

In one embodiment, the system performs a sufficient quantity of iterations so that all GAN generators for all classes to be trained are trained. The trained GAN generators can be used for real data.

Accordingly, the system can train multiple GAN generators with respect to one type of object and then combine the results. The system can train the lowest level in an unsupervised approach and keep iterating and converging. Eventually, the generator is trained so that it can transfer from the synthetic data set to the real data set. Training can also be done using a small subset of labels from either or both domains (things and stuff) and the quantity of labels incrementally increased.

Figure 3:
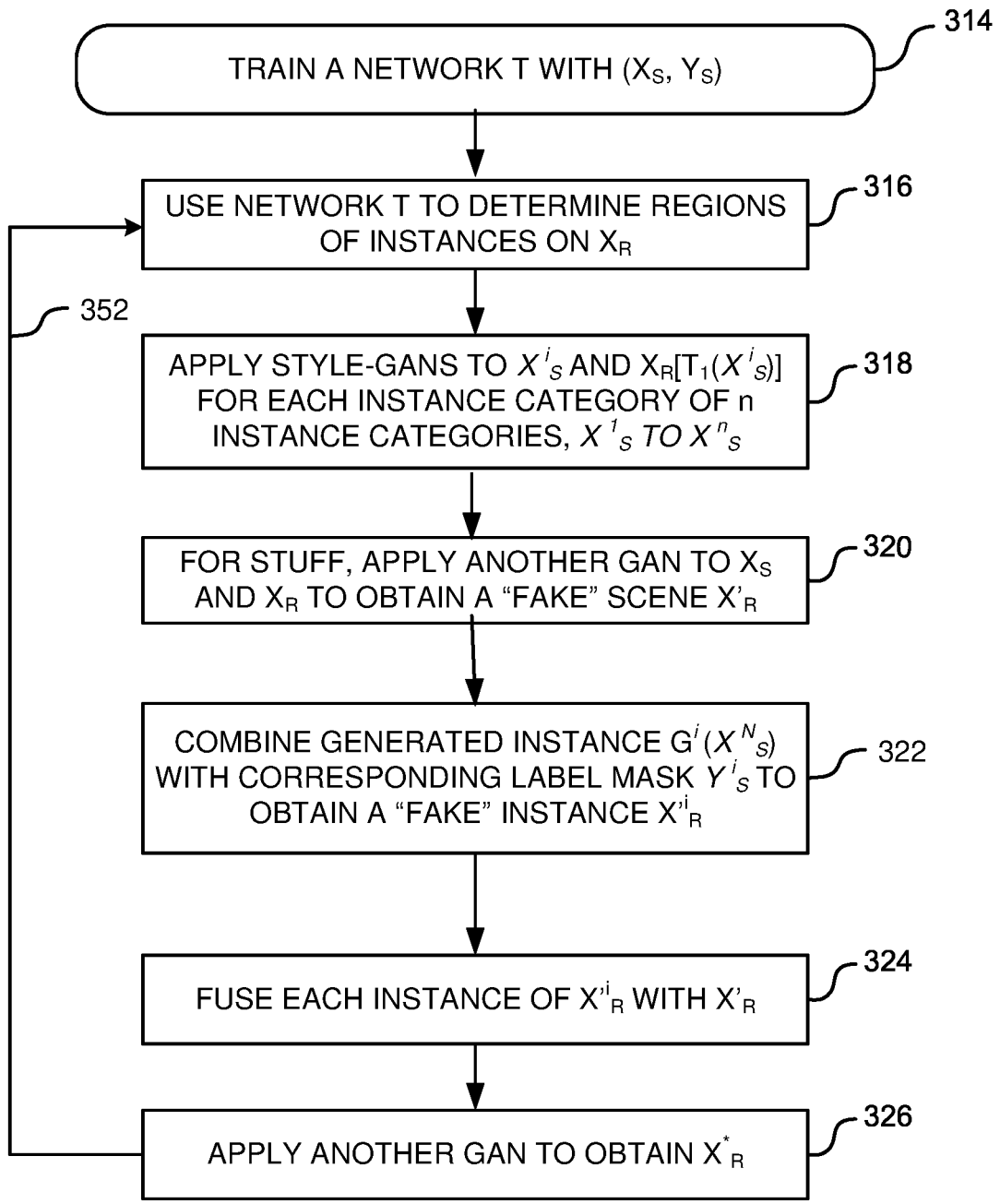
FIG. 3 illustrates an example training framework for unsupervised domain adaptation in accordance with various embodiments.
Figure 4:
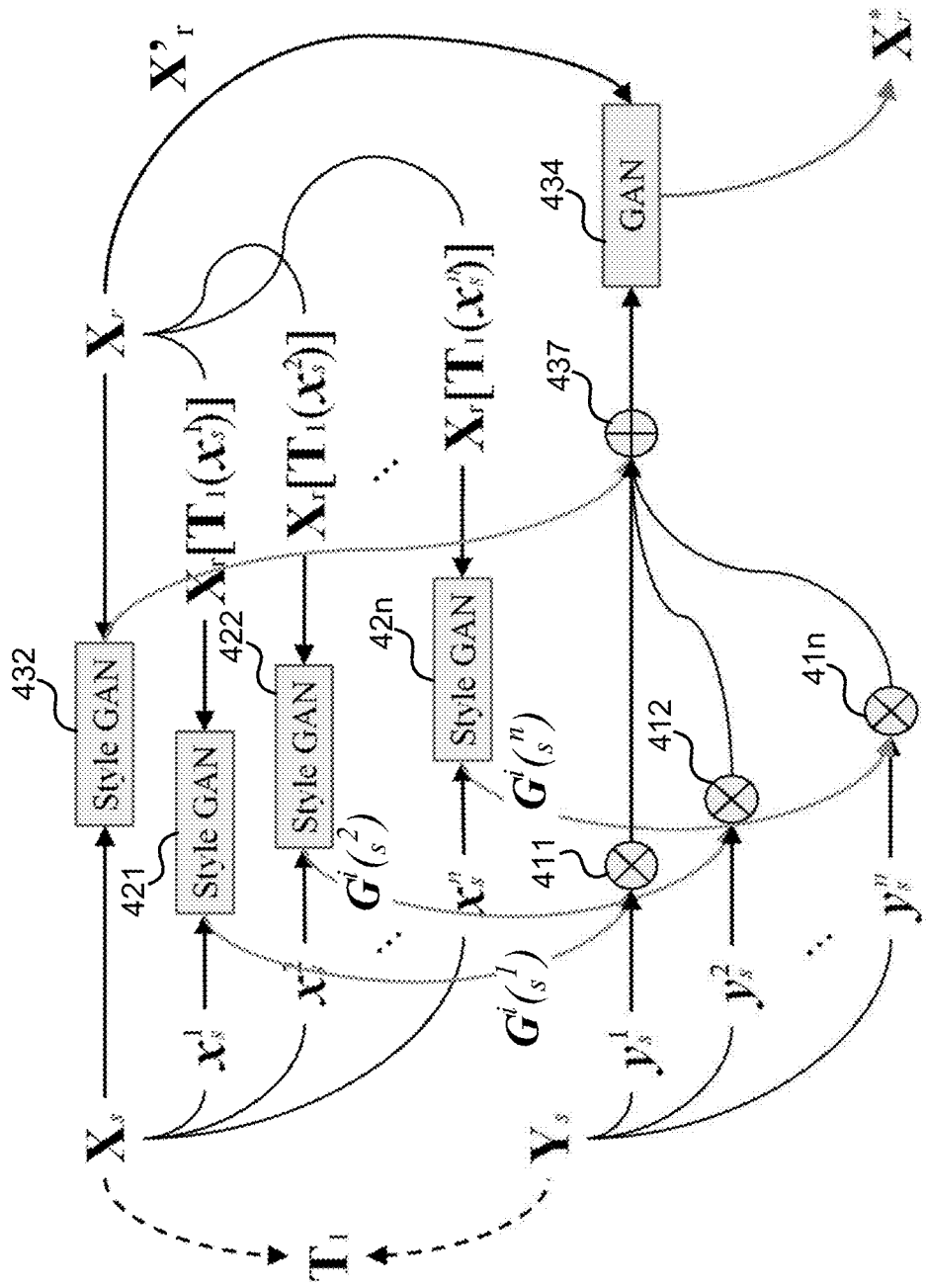
FIG. 4 illustrates an example architecture for the process of FIG. 3 in accordance with various embodiments.

FIG. 3 illustrates an example training framework process for unsupervised domain adaptation in accordance with various embodiments. FIG. 4 illustrates an example architecture for the process of FIG. 3 in accordance with various embodiments. An example embodiment is now described in the context of simulation to real-word (Sim2Real) simulated learning, but the framework can be applied to any domain adaptation problem. For the following discussion this notation is adopted: $X_s$ denotes the images from the simulation domain, $Y_s$ denotes the label of $X_s$ including both semantic and instance segmentation, $X_r$ denotes the images from real-world domain, $Y_r$ denotes the label of $X_r$ including both semantic and instance segmentation, T is a task network, as well as a panoptic segmentation network. For each category of instance $x^i_s$, the corresponding instance label is $y^i_s$.

The example training framework begins at operation 314, in which the system trains a network T with ($X_s$, $Y_s$). If Semi-supervised Domain Adaption (Semi-DA), in which at least a limited set of $Y_r$ are already available, the data ($X_r$, $Y_r$) can be used with ($X_s$, $Y_s$) to pretrain a model to have a better starting point. At operation 316, the system uses network T to obtain regions of instances on $X_r$.

At operation 318, for each instance category of n instance categories, $x^1_s$ to $x^n_s$, the system applies style-GANs 42$i$ to $x^i_s$ and $X_r[T_1(x^i_s)]$.

At operation 320, for stuff, the system applies another GAN 432 to $X_s$ and $X_r$ to obtain a "fake" scene $X'_r$.

At operation 322, each generated instance $G^i$ ($x^n_s$) is combined at combiners 41$i$ (411-41$n$) with its corresponding label mask $y^i_s$ (e.g., $y^1_s$ to $y^n_s$) to obtain a "fake" instance $x'^i_r$ (e.g., $x^1_r$ to $X^n_r$).

At operation 324, each instance $x'^i_r$ (from latent $z^i$) is fused with "fake" scene $X'_r$ (stuff) at adder 437. At operation 326, the system applies another GAN 434 to obtain $X^*_r$. Latent $z^i$ may be a vector of random variable that can be used to control the variance of latent space.

Figure 5:
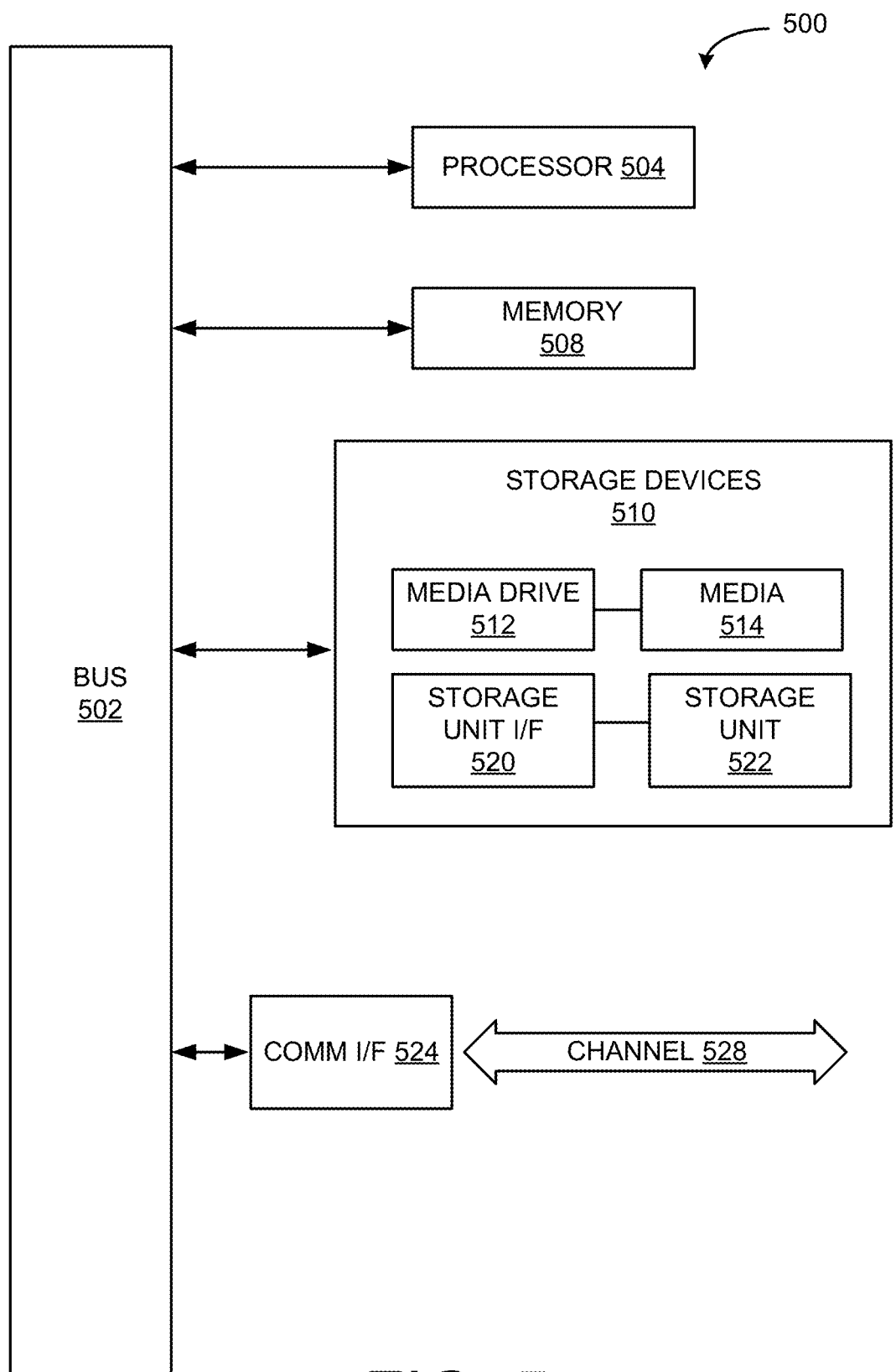
FIG. 5 is an example computing component that may be used to implement various features of embodiments described in the present disclosure.

As illustrated by flow line 352, the operation returns to step 314, in which $X_s$ is replaced with $X^*_r$ for next iteration, and the process repeats with $X^*_r$ as the simulation data.

Where embodiments of the system are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for panoptic segmentation of an image of a scene, comprising:
   (a) receiving a synthetic data set as simulation data set in a simulation domain, the simulation data set comprising a plurality of synthetic data objects;
   (b) disentangling the synthetic data objects by grouping the synthetic data objects by class for a plurality of object classes and labeling each class of grouped synthetic data objects;
   (c) training each class of the plurality of classes separately by applying a first Generative Adversarial Network (GAN) to each class from the data set in the simulation domain to create a generated instance for each class;
   (d) combining the generated instances for each class with the labels for the objects in each class to obtain a fake instance of an object;
   (e) fusing the fake instances to create a fused image; and
   (f) applying a second GAN to the fused image and a corresponding real data set in a real-world domain to obtain an updated data set.

2. The method of claim 1, further comprising repeating operations (a)-(f) as a next iteration using the updated data set as the simulation data set in the next iteration.

3. The method of claim 1, further comprising repeating operations (a)-(f) as a plurality iterations subsequent to the next iteration, wherein each subsequent iteration uses the updated data set from its immediately preceding iteration as its simulation data set.

4. The method of claim 3, wherein a quantity of iterations performed is a quantity sufficient to train all GAN generators for all classes to be trained.

5. The method of claim 1, further comprising applying a GAN to the simulation data set in a simulation domain and a corresponding real data set in a real-world domain to obtain a fake scene.

6. The method of claim 5, further comprising fusing the fake instances with the fake scene to create the fused image.

7. The method of claim 6, wherein the fused image comprises a fake scene with fake instances.

8. The method of claim 1, wherein applying a first GAN to each class from the data set in the simulation domain comprises applying a GAN to a category of instance and region of instance for each class from the data set in the simulation domain.

9. A system for photorealistic object recognition for an autonomous vehicle using panoptic segmentation of an image of a scene, the system comprising:
   a non-transitory memory that stores instructions;
   at least one processor that executes the instructions to perform the operations of:
   (a) receiving a synthetic data set as simulation data set in a simulation domain, the simulation data set comprising a plurality of synthetic data objects encountered by the autonomous vehicle;
   (b) disentangling the synthetic data objects by grouping the synthetic data objects by class for a plurality of object classes and labeling each class of grouped synthetic data objects;
   (c) training each class of the plurality of classes separately by applying a first Generative Adversarial Network (GAN) to each class from the data set in the simulation domain to create a generated instance for each class;
   (d) combining the generated instances for each class with labels for the objects in each class to obtain a fake instance of an object;
   (e) fusing the fake instances to create a fused image; and
   (f) applying a second GAN to the fused image and a corresponding real data set in a real-world domain to obtain an updated data set.

10. The system of claim 9, wherein the operations further comprise repeating operations (a)-(f) as a next iteration using the updated data set as the simulation data set in the next iteration.

11. The system of claim 9, wherein the operations further comprise repeating operations (a)-(f) as a plurality iterations subsequent to the next iteration, wherein each subsequent iteration uses the updated data set from its immediately preceding iteration as its simulation data set.

12. The system of claim 11, wherein a quantity of iterations performed is a quantity sufficient to train all GAN generators for all classes to be trained.

13. The system of claim 9, wherein the operations further comprise applying a GAN to the simulation data set in a simulation domain and a corresponding real data set in a real-world domain to obtain a fake scene.

14. The system of claim 13, wherein the operations further comprise fusing the fake instances with the fake scene to create the fused image.

15. The system of claim 14, wherein the fused image comprises a fake scene with fake instances.

16. The system of claim 9, wherein applying a first GAN each class from the data set in the simulation domain comprises applying a GAN to a category of instance and region of instance for each class from the data set in the simulation domain.

* * * * *